No. 827,038. PATENTED JULY 24, 1906.
J. SCHENBECK.
WIND MOTOR.
APPLICATION FILED NOV. 28, 1904.

2 SHEETS—SHEET 1.

Witnesses:
C. H. Wilson
F. Schlotfeld

Inventor:
John Schenbeck
By Rudolph Mr. Fox
Attorney

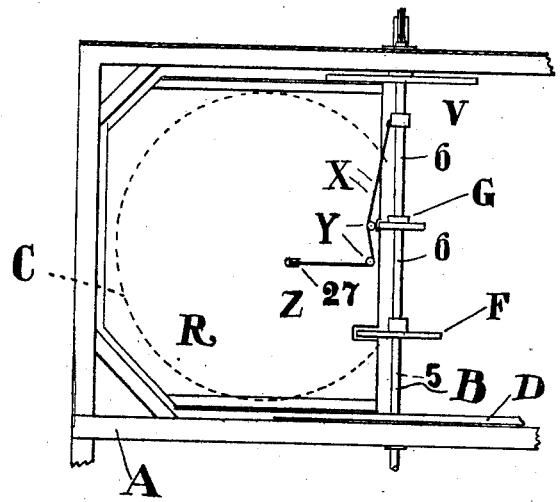
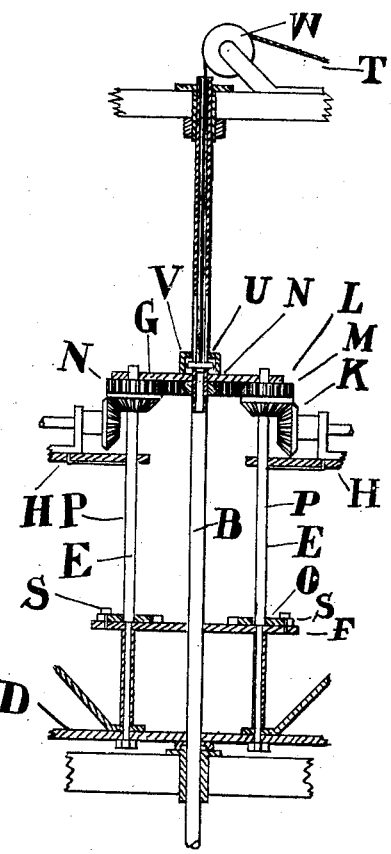
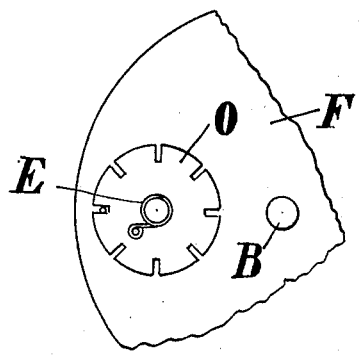
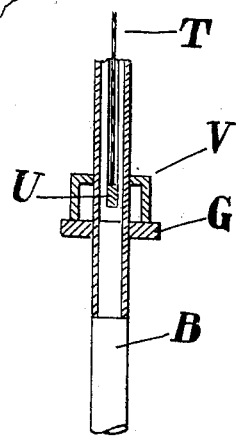

UNITED STATES PATENT OFFICE.

JOHN SCHENBECK, OF CHICAGO, ILLINOIS.

WIND-MOTOR.

No. 827,038.   Specification of Letters Patent.   Patented July 24, 1906.

Application filed November 28, 1904. Serial No. 234,571.

*To all whom it may concern:*

Be it known that I, JOHN SCHENBECK, a citizen of the United States, residing at Chicago, in the county of Cook and State of Illinois, have invented certain new and useful Improvements in Wind-Motors; and I do hereby declare the following to be a full, clear, and exact description of the invention, such as will enable others skilled in the art to which it appertains to make and use the same.

My invention relates to a novel construction in a windmill, the object being to provide a device of this character in which the wind-wheels are held facing the wind at all times and drive a common shaft and when bolted together will be out of operation; and it consists, further, in the specific means for controlling said wheels and the gearing between the same and a shaft actuated thereby; and it consists in the features of construction and combinations of parts, hereinafter fully described and claimed.

Figure 1:
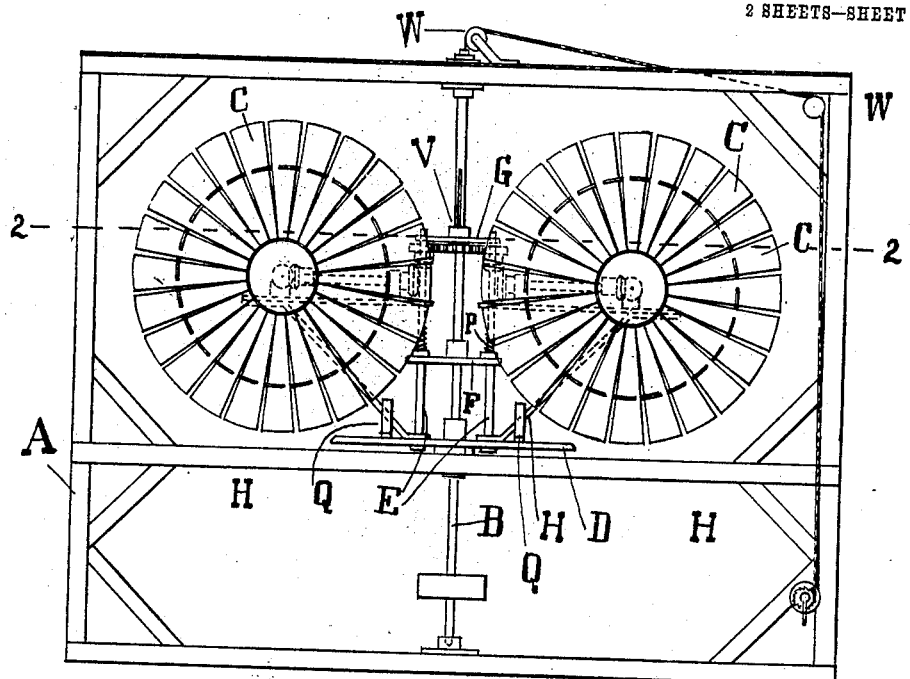
Figure 2:
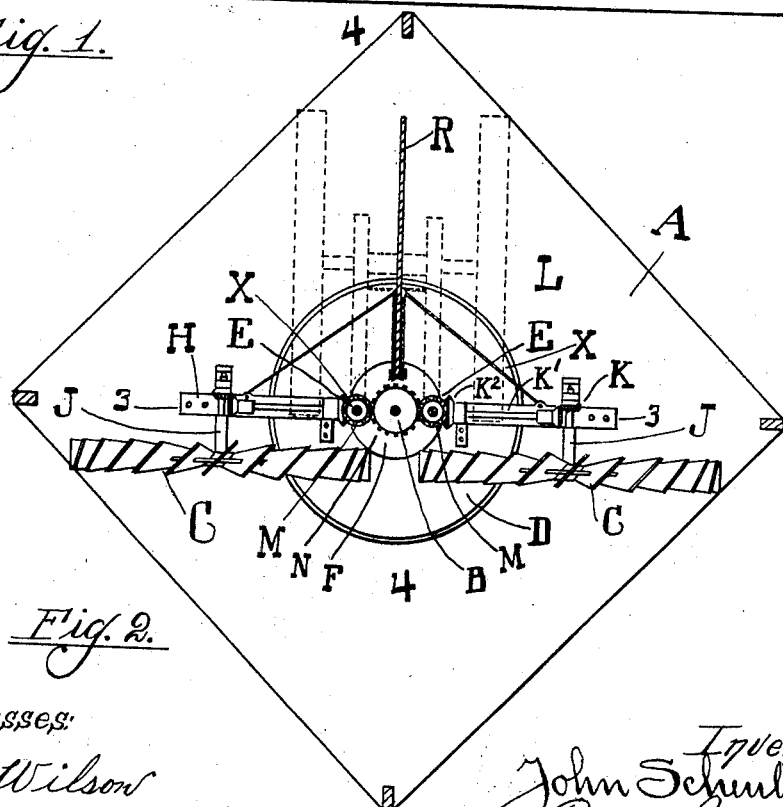

In the accompanying drawings, illustrating my invention, Figure 1 is a view in front elevation of a windmill - tower and motor mounted therein constructed in accordance with my invention. Fig. 2 is a horizontal section of same on the line 2 2 of Fig. 1. Fig. 3 is a fragmentary detail section on the line 3 3 of Fig. 2 and shows the vane in side elevation. Fig. 4 is a fragmentary detail vertical section on the line 4 4 of Fig. 2. Fig. 5 is a fragmentary detail plan view, on an enlarged scale, showing the means for regulating the tension of springs for holding the wind-wheels normally facing the wind. Fig. 6 is a fragmentary detail vertical section on the line 6 6 of Fig. 4.

My said device comprises the tower or hood at the top of the tower A of a windmill, through which a vertical shaft B passes, which is adapted to be driven from the wind-wheels C, geared thereto, as hereinafter described. Loosely journaled on said shaft B is a turn-table D, in which a pair of vertical shafts E are journaled at their lower ends, said shafts being journaled between their ends and at their upper ends in plates F and G, loosely mounted on said shaft B. Loosely mounted on said shafts E are the free ends of the arms of supporting frames or brackets H, each of which carries a journal-box J, in which the shafts of said wind-wheels C are journaled, said shafts carrying bevel-pinions K, meshing with bevel-pinions at the outer ends of horizontal shafts K', which at their other ends carry bevel-pinions K², meshing with bevel-pinions L on said shafts E. The latter carry spur-pinions M, meshing with the spur-gear N on said shaft B, which is thus revolved, said gearing being so arranged that both said wind-wheels revolve in the same direction and serve to revolve said shaft B always in the same direction. Mounted on said plate F and surrounding said shafts E are two toothed plates O, each engaging one end of a spiral spring P, the other end of which engages one of the arms of each of said frames H and serves to hold the same in engagement with a stop Q in the turn-table D, and in this position the planes of the wind-wheels C are disposed substantially at right angles to the plane of the vane R, by means of which said turn-table is revolved in an obvious manner. The said springs serve to hold said wind-wheels yieldingly facing the wind and serve, further, as governors to enable the said wind-wheels to turn out of operative position in the event that the wind should increase in velocity beyond a safe point. By means of said toothed wheels O the tension of said spring is regulated in an obvious manner, the same being held in position relatively to the plate F by means of pins S. In the event that it should be desired to turn said wheels C out of operative position I provide simple means for accomplishing this purpose. These means consist in providing a central opening through the upper end portion of the shaft B for the passage of a cable T, which is connected at one end with a cross-head U, the ends of which project through longitudinal slots on said shaft B and at their free ends engage a vertical movable collar V on said shaft, said cable being turned over a plurality of pulleys W and depending at its free end near the ground. Connected with the said collar V at one end are two cables X, which pass downwardly and are turned over idlers Y on opposite sides of said vane R, thence pass through an opening Z in said vane in opposite directions, there being idlers 27 disposed in said opening, and are connected at their other ends with said frames H adjacent the journals of said wind-wheels. Obviously by pulling on said cable the said collar V will be raised and said cables X will act to turn said wind-wheels toward said vane against the action of said spring P, and they will thus be held out of operative position. The connection between said cable T and said cross-head is so made as to permit of free relative rotation of both members, thus abviating the possibility of said cable T being twisted by the revolution of said shaft V.

In order to obtain the best results, it is essential that the wind-wheels C should be disposed as nearly as possible in alinement with the drive-shaft B, as if the same project normally very far forward of said shaft they will tend to overcome to some extent the action of the vane R.

I desire to call particular attention to the yielding means for holding the wind-wheels normally in operative position, as this forms one of the most essential features of my invention and prevents breakage of the operative parts by wind of high velocity.

I claim as my invention—

1. In a wind-motor, the combination with the drive-shaft, of an independently-rotatable turn-table, two vertically-disposed shafts carried thereby, frames pivotally mounted on said last-named shafts and carrying wind-wheels, gearing between said wind-wheels and said drive-shaft, and springs engaging said frames for holding said wind-wheels yieldingly in operative position.

2. In a wind-motor, the combination with the drive-shaft, of an independently-rotatable turn-table, two vertically-disposed shafts carried thereby, frames pivotally mounted on said last-named shafts and carrying wind-wheels, gearing between said wind-wheels and said drive-shaft, springs engaging said frame for holding said wind-wheels in operative position, and means for adjusting the tension of said springs.

3. In a wind-motor, the combination with the drive-shaft, of an independently-rotatable turn-table, a vane carried thereby, two vertically-disposed shafts on said turn-table, a frame pivotally mounted on each of said last-named shafts, a wind-wheel revolubly mounted in the free end of each of said frames and disposed on relatively opposite sides of said vane, stops on said turn-table to limit the movements of said frames in one direction, springs for yieldingly holding said frames in engagement with said stops to maintain said wind-wheels normally in operative position, and gearing between said wind-wheels and said drive-shaft.

4. In a wind-motor, the combination with the drive-shaft, of an independently-rotatable turn-table, a vane carried thereby, two vertically-disposed shafts on said turn-table, a frame pivotally mounted on each of said last-named shafts, a wind-wheel revolubly mounted in the free end of each of said frames and disposed on relatively opposite sides of said vane, stops on said turn-table to limit the movements of said frames in one direction, springs for yieldingly holding said frames in engagement with said stops to maintain said wind-wheels normally in operative position, gearing between said wind-wheels and said drive-shaft, and means for throwing said wind-wheels out of operative position against the action of said springs.

5. In a wind-motor, the combination with the drive-shaft, of an independently-rotatable turn-table, a vane carried thereby, two vertically-disposed shafts on said turn-table, a frame pivotally mounted on each of said last-named shafts, a wind-wheel revolubly mounted in the free end of each of said frames and disposed on relatively opposite sides of said vane, stops on said turn-table to limit the movements of said frames in one direction, springs for yieldingly holding said frames in engagement with said stops to maintain said wind-wheels normally in operative position, gearing between said wind-wheels and said drive-shaft, means for throwing said wind-wheels out of operative position against the action of said springs, said means including cables secured at one end to the free end portions of said frames and passing in opposite directions through an opening in the vane and connected at their other ends with a collar longitudinally and revolubly movable on said drive-shaft, idlers over which said cables are trained, and means for imparting longitudinal movement to said collar.

6. In a wind-motor, the combination with the drive-shaft, of an independently-rotatable turn-table, a vane carried thereby, two vertically-disposed shafts on said turn-table, a frame pivotally mounted on each of said last-named shafts, a wind-wheel revolubly mounted in the free end of each of said frames and disposed on relatively opposite sides of said vane, stops on said turn-table to limit the movements of said frames in one direction, springs for yieldingly holding said frames in engagement with said stops to maintain said wind-wheels normally in operative position, gearing between said wind-wheels and said drive-shaft, means for throwing said wind-wheels out of operative position against the action of said springs, said means including cables secured at one end to the free end portions of said frames and passing in opposite directions through an opening in the vane and connected at their other ends with a collar longitudinally and revolubly movable on said drive-shaft, idlers over which said cables are trained, means for imparting longitudinal movement to said collar, comprising a cross-head mounted in a longitudinal slot in said drive-shaft, the latter being provided with a central opening, and a cable passing through said central opening and pivotally connected with said cross-head.

In testimony whereof I have signed my name in presence of two subscribing witnesses.

JOHN SCHENBECK.

Witnesses:
RUDOLPH WM. LOTZ,
F. SCHLOTFELD.